(12) United States Patent
Hoshiyama et al.

(10) Patent No.: US 12,159,399 B2
(45) Date of Patent: Dec. 3, 2024

(54) INFORMATION PROCESSING APPARATUS

(71) Applicant: CANON MEDICAL SYSTEMS CORPORATION, Otawara (JP)

(72) Inventors: Yutaka Hoshiyama, Nasushiobara (JP); Yoshimori Kassai, Nasushiobara (JP); Yuto Ono, Nasushiobara (JP); Junichiro Araoka, Nasushiobara (JP); Kazuya Tanoue, Utsunomiya (JP); Hidetaka Konta, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 631 days.

(21) Appl. No.: 17/473,307

(22) Filed: Sep. 13, 2021

(65) Prior Publication Data
US 2022/0084202 A1   Mar. 17, 2022

(30) Foreign Application Priority Data

Sep. 15, 2020   (JP) ................... 2020-154816

(51) Int. Cl.
*G16H 30/40*   (2018.01)
*G06F 18/2132*   (2023.01)
*G06T 7/00*   (2017.01)

(52) U.S. Cl.
CPC ........ *G06T 7/0012* (2013.01); *G06F 18/2132* (2023.01); *G06T 2207/10088* (2013.01); *G06T 2207/20081* (2013.01)

(58) Field of Classification Search
USPC ....... 128/920–925; 358/1.1–3.29, 1.11–1.18; 382/128–302; 600/921
See application file for complete search history.

(56) References Cited

U.S. PATENT DOCUMENTS 11,690,579 B2 *   7/2023   Karanam ............... G06N 3/045
                                                                600/407
2013/0329982 A1 *  12/2013   Alghamdi ............ G16Z 99/00
                                                                382/132

(Continued)

FOREIGN PATENT DOCUMENTS

JP   2009-34514 A    2/2009
JP   2009-219577 A   10/2009

(Continued)

OTHER PUBLICATIONS

Japanese Office Action issued Jan. 23, 2024 in Japanese Application No. 2020-154816 citing document No. 15, 3 pgs.

(Continued)

*Primary Examiner* — Marcellus J Augustin
(74) *Attorney, Agent, or Firm* — Oblon, McClelland, Maier & Neustadt, L.L.P.

(57) ABSTRACT

An information processing apparatus according to an embodiment includes processing circuitry. The processing circuitry is configured to perform an image generating process of generating a plurality of medical images on the basis of a plurality of imaging parameter groups, the plurality of imaging parameter groups being updated by adversarial learning. The processing circuitry is configured to perform a discriminating process of discriminating whether or not each of the plurality of medical images is a target image acquired by a first medical imaging apparatus in the adversarial learning. The processing circuitry is configured to output one of the imaging parameter groups used for generating the medical images in the image generating process when the adversarial learning has converged.

6 Claims, 6 Drawing Sheets

(56) References Cited

U.S. PATENT DOCUMENTS

| | | |
|---|---|---|
| 2019/0108904 A1 | 4/2019 | Zhou et al. |
| 2020/0402644 A1 | 12/2020 | Zhou et al. |
| 2021/0233239 A1* | 7/2021 | Li .......................... G16H 30/40 |
| 2021/0343001 A1* | 11/2021 | Grama ................. G06N 3/0475 |

FOREIGN PATENT DOCUMENTS

| | | |
|---|---|---|
| JP | 2019-069145 A | 5/2019 |
| JP | 2020-010823 A | 1/2020 |

OTHER PUBLICATIONS

Japanese Office Action issued Jun. 4, 2024 in Japanese Patent Application No. 2020-154816, citing reference 15 therein, 2 pages.

* cited by examiner

INFORMATION PROCESSING APPARATUS

CROSS-REFERENCE TO RELATED APPLICATIONS

This application is based upon and claims the benefit of priority from Japanese Patent Application No. 2020-154816, filed on Sep. 15, 2020; the entire contents of which are incorporated herein by reference.

FIELD

Embodiments described herein relate generally to an information processing apparatus.

BACKGROUND

Conventionally, with Magnetic Resonance Imaging (MRI) apparatuses, it is possible to change characteristics of magnetic resonance images such as contrast and a resolution, by using settings of various types of imaging parameters.

Relationships between the various types of imaging parameters and the image characteristics of the captured magnetic resonance images such as the contrast and the resolution vary depending on models of magnetic resonance imaging apparatuses and characteristics of individual magnetic resonance imaging apparatuses. For this reason, even when the settings of the imaging parameters are the same, magnetic resonance images being captured may have mutually-different image characteristics, when mutually-different magnetic resonance imaging apparatuses are employed to capture the images.

DETAILED DESCRIPTION

Exemplary embodiments of an information processing apparatus will be explained in detail below, with reference to the accompanying drawings.

First Embodiment

An information processing apparatus according to an embodiment includes processing circuitry. The processing circuitry is configured to perform an image generating process of generating a plurality of medical images on the basis of a plurality of imaging parameter groups, the plurality of imaging parameter groups being updated by adversarial learning. The processing circuitry is configured to perform a discriminating process of discriminating whether or not each of the plurality of medical images is a target image acquired by a first medical imaging apparatus in the adversarial learning. The processing circuitry is configured to output one of the imaging parameter groups used for generating the medical images in the image generating process when the adversarial learning has converged.

Figure 1:
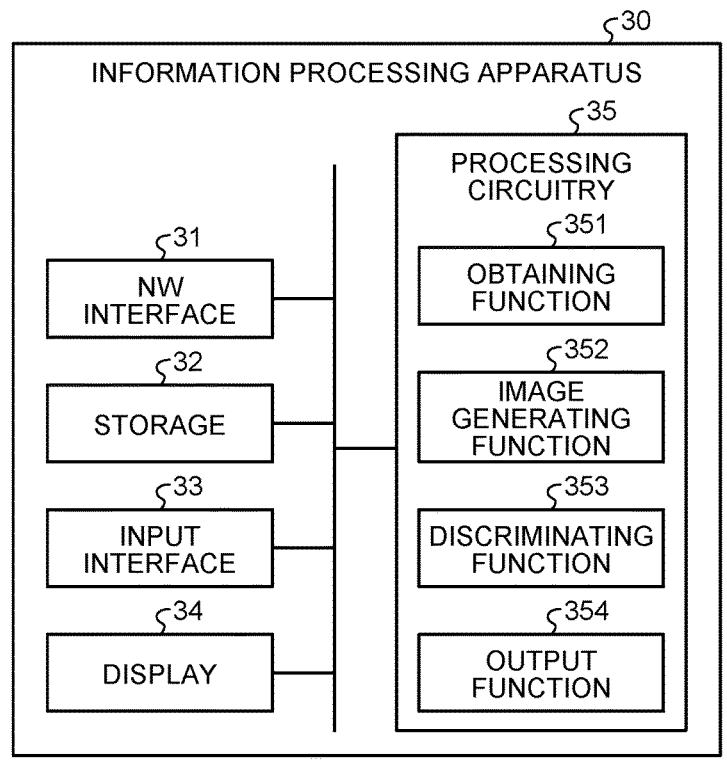
FIG. 1 is a block diagram illustrating an example of an information processing apparatus according to a first embodiment.

FIG. 1 is a block diagram illustrating an example of an information processing apparatus 30 according to a first embodiment. For example, the information processing apparatus 30 may be a Personal Computer (PC), a server apparatus, or the like, such as a workstation installed in a hospital. Alternatively, the information processing apparatus 30 may be provided in a cloud environment or the like. The information processing apparatus 30 connects to other information processing apparatuses via a network such as an intra-hospital Local Area Network (LAN) installed in the hospital or the Internet.

As illustrated in FIG. 1, the information processing apparatus 30 includes a network (NW) interface 31, storage 32, an input interface 33, a display 34, and processing circuitry 35.

The NW interface 31 is connected to the processing circuitry 35 and is configured to control transfer of various types of data and communication with the other information processing apparatuses connected to the information processing apparatus 30 via the network. Examples of the other information processing apparatuses include an image storage device such as one in a Picture Archiving and Communication System (PACS) and modalities such as a Magnetic Resonance Imaging (MRI) apparatus; however, possible embodiments are not limited to these examples. Typically, various types of data handled in the present disclosure are digital data.

The storage 32 is configured to store therein various types of programs executed by the processing circuitry 35. Further, the storage 32 is configured to store therein imaging parameters updated by the processing circuitry 35 (explained later). The imaging parameters will be explained later.

For example, the storage 32 may be a semiconductor memory element such as a Random Access Memory (RAM) or a flash memory, or a hard disk, an optical disk, or the like. Alternatively, the storage 32 may be provided on the outside of the information processing apparatus 30, such as in a cloud environment, for example.

The input interface 33 is configured to receive various types of instructions and inputs of information from an operator. For example, the input interface 33 is realized by using a trackball, a switch button, a mouse, a keyboard, a touchpad on which input operations can be performed by touching an operation surface thereof, a touch screen in which a display screen and a touchpad are integrally formed, contactless input circuitry using an optical sensor, audio input circuitry, and/or the like. The input interface 33 is connected to the processing circuitry 35 and is configured to convert input operations received from the operator into electrical signals and to output the electrical signals to the processing circuitry 35. The input interface 33 does not necessarily have to include physical component parts such as the mouse, the keyboard, and/or the like. Possible examples of the input interface 33 include electrical signal processing circuitry configured to receive an electrical signal corresponding to an input operation from an external input device provided separately from the information processing apparatus 30 and to output the electrical signal to controlling circuitry.

The display 34 is configured to display, under control of the processing circuitry 35, a Graphical User Interface (GUI) used for receiving user operations and results of processes performed by the processing circuitry 35. For example, the display 34 may be a display such as a liquid crystal display monitor.

The processing circuitry 35 is processing circuitry configured to realize functions corresponding to programs, by reading and executing the programs from the storage 32. The processing circuitry 35 includes an obtaining function 351, an image generating function 352, a discriminating function 353, and an output function 354. The obtaining function 351 is an example of an obtaining unit. The image generating function 352 is an example of an image generating unit. The discriminating function 353 is an example of a discriminating unit. The output function 354 is an example of an output unit.

In this situation, for example, processing functions of constituent elements of the processing circuitry 35, namely, the obtaining function 351, the image generating function 352, the discriminating function 353, and the output function 354 are stored in the storage 32 in the form of computer-executable programs. For example, the processing circuitry 35 is configured to realize the functions corresponding to the programs, by reading and executing the programs from the storage 32. In other words, the processing circuitry 35 that has read the programs has the functions illustrated within the processing circuitry 35 in FIG. 1. Further, although the example was explained with reference to FIG. 1 in which the single piece of processing circuitry realizes the processing functions implemented by the obtaining function 351, the image generating function 352, the discriminating function 353, and the output function 354, it is also acceptable to structure the processing circuitry 35 by combining together a plurality of pieces of independent processing circuitry, so that the functions are realized as a result of the pieces of processing circuitry executing the programs. Further, although the example was explained with reference to FIG. 1 in which the single piece of storage (i.e., the storage 32) stores therein the programs corresponding to the processing functions, another arrangement is also acceptable in which a plurality of pieces of storage and/or a plurality of pieces of memory are provided in a distributed manner, so that the processing circuitry 35 reads a corresponding program from each of the individual pieces of storage and/or memory.

In the description above, the example was explained in which the "processing circuitry" is configured to read and execute the programs corresponding to the functions from the storage 32; however, possible embodiments are not limited to this example. The term "processing circuitry" denotes, for example, a Central Processing Unit (CPU), a Graphics Processing Unit (GPU), or circuitry such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). When the processing circuitry is a CPU, for example, the processing circuitry realizes the functions by reading and executing the programs saved in the storage 32. In contrast, when the processing circuitry is an ASIC, instead of having the programs saved in the storage 32, the functions are directly incorporated in the circuitry of the processing circuitry, as logic circuitry. Further, the pieces of processing circuitry of the present embodiments do not each necessarily have to be structured as a single piece of circuitry. It is also acceptable to structure one piece of processing circuitry by combining together a plurality of pieces of independent circuitry so as to realize the functions thereof. Further, it is also acceptable to integrate two or more of the constituent elements illustrated in FIG. 1 into one piece of processing circuitry so as to realize the functions thereof.

For example, the obtaining function 351 is configured to obtain a target image via the NW interface 31. The target image may be obtained, for example, from an image storage device such as one in the PACS or from a modality such as a magnetic resonance imaging apparatus; however, possible embodiments are not limited to these examples. Alternatively, the obtaining function 351 may obtain the target image from an external storage device or the like connected to the information processing apparatus 30, without the intermediation of the NW interface 31.

The target image is a medical image acquired by a medical imaging apparatus (a modality). In the present embodiment, the target image and an imitation image (explained later) will both be referred to as medical images. The medical imaging apparatus that acquired the target image is an example of the first medical imaging apparatus according to the present embodiment.

In the present embodiment, the target image is a magnetic resonance image captured by a magnetic resonance imaging apparatus. The magnetic resonance imaging apparatus is an example of the medical imaging apparatus. For example, the target image may be a magnetic resonance image actually captured for the purpose of diagnosing a patient. The target image has image characteristics desired by a medical technologist, a medical doctor, or the like (hereinafter, "technologist or the like").

The term "image characteristics" denotes characteristics of the medical images. In the present embodiment, the image characteristics are represented by contrast, a Signal-to-Noise Ratio (SNR), a resolution, and a tissue rendered in a Region Of Interest (ROI). However, the image characteristics are not limited to these examples. Further, the image characteristics may be one selected from among: contrast, an SNR, a resolution, and a tissue rendered in a ROI. Alternatively, the image characteristics may be a combination of two or more selected from among the above. Further, the image characteristics may be represented by one or more other pieces of information. In the present embodiment, it is assumed that the image characteristics include at least one selected from among contrast, an SNR, and a resolution.

For example, when using a magnetic resonance imaging apparatus to capture a magnetic resonance image, the technologist or the like sets imaging parameters in accordance with the desired image characteristics. In this situation, even when the settings of the imaging parameters are the same, magnetic resonance images that are actually captured may vary depending on characteristics of the individual magnetic resonance apparatuses. In other words, the target image is an image captured with appropriate imaging parameters set by the technologist or the like, in accordance with the characteristics of the magnetic resonance imaging apparatus employed in the imaging process. Magnetic resonance images of which the imaging parameters were not appropriately set by the technologist or the like and magnetic resonance images captured at the stage of trial and error are not adopted as the target image. In the following sections, the characteristics of the magnetic resonance imaging apparatus will be referred to as apparatus characteristics.

The imaging parameters include Repetition Time (TR), Echo Time (TE), Inversion Time (TI), a Flip Angle (FA) of a radio frequency magnetic field pulse, slice positions, the number of slices, a slice thickness, a Field Of View (FOV), whether a filter is present, the type of the filter, the position of a pre-pulse, timing of the pre-pulse, and/or the like. The imaging parameters are not limited to these examples.

In the present embodiment, a set made up of a plurality of imaging parameters used by the magnetic resonance imaging apparatus to capture the magnetic resonance image will be referred to as an imaging parameter group. For example, the imaging parameter group may include one or more of the imaging parameters listed above or may include all of the imaging parameters listed above. Further, because the imaging parameters are not limited to the examples above, the imaging parameter group may include one or more items other than the imaging parameters listed above. In the present embodiment, it is assumed that the imaging parameter group includes at least one selected from among the TR, the TE, the TI, and the FA.

The apparatus characteristics of the magnetic resonance imaging apparatus denote certain elements among capabilities and specifications of the magnetic resonance imaging apparatus that have impacts on a captured result of the magnetic resonance image. In the present embodiment, the apparatus characteristics of the magnetic resonance imaging apparatus include not only design-related specifications and capabilities of each model of magnetic resonance imaging apparatus, but also differences that occur among individual magnetic resonance imaging apparatuses even when the apparatuses are of the same model. However, the definition of the apparatus characteristics is not limited to the one presented above. It is also acceptable to use only the design-related specifications or the capabilities of each model of magnetic resonance imaging apparatus as the apparatus characteristics.

For example, in the present embodiment, the apparatus characteristics of the magnetic resonance imaging apparatus include: gradient coil characteristics, static magnetic field characteristics, and Radio Frequency (RF) coil characteristics. The gradient coil characteristics include, for example, a gradient magnetic field maximum intensity, a slew rate (a change amount in the gradient magnetic field per unit time period), and non-linearity of the gradient magnetic field. Further, the static magnetic field characteristics include, for example, a static magnetic field intensity and non-uniformity of the static magnetic field. Further, the radio frequency coil characteristics include, for example, spatial non-uniformity of sensitivity of the radio frequency coil and an SNR.

Although possible examples of the apparatus characteristics of the magnetic resonance imaging apparatus are not limited to these, it is assumed in the present embodiment that the apparatus characteristics include at least one selected from among: the gradient coil characteristics, the static magnetic field characteristics, and the radio frequency coil characteristics. Further, the apparatus characteristics of the magnetic resonance imaging apparatus may include not only capabilities or specifications of hardware (e.g., the gradient coil, the static magnetic field magnet, and the radio frequency coil) of the magnetic resonance imaging apparatus, but also capabilities or specifications of software that controls these pieces of hardware. For example, the apparatus characteristics of the magnetic resonance imaging apparatus may include capabilities of software that switches between gradient magnetic fields by controlling the gradient coil.

The obtaining function 351 is configured to forward the obtained target image to the discriminating function 353.

The image generating function 352 and the discriminating function 353 are configured to perform adversarial learning. The image generating function 352 and the discriminating function 353 may collectively be referred to as a learning function. The learning function is an example of a learning unit.

Figure 2:
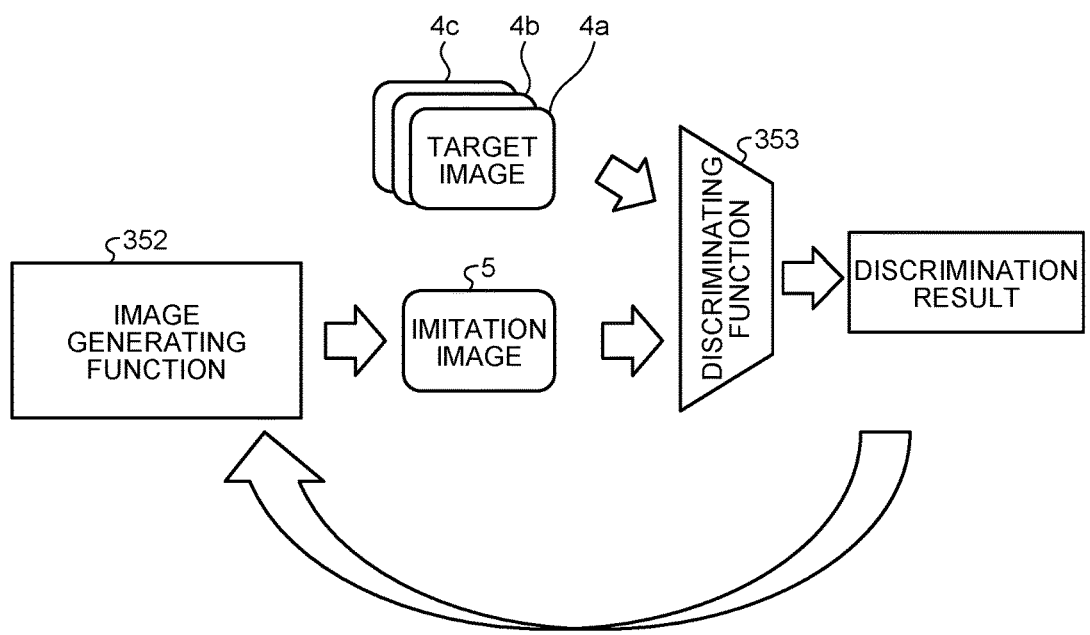
FIG. 2 is a drawing illustrating an example of a relationship between an image generating function and a discriminating function according to the first embodiment.

FIG. 2 is a drawing illustrating an example of a relationship between the image generating function 352 and the discriminating function 353 according to the first embodiment. As illustrated in FIG. 2, the image generating function 352 generates an imitation image 5. The imitation image 5 is an image imitating target images 4a to 4c. More specifically, the imitation image 5 according to the present embodiment is a magnetic resonance image simulatively generated by the image generating function 352. The image generating function 352 is configured to generate the imitation image 5 on the basis of a plurality of mutually-different imaging parameter groups generated at random. Further, in the generating process for the second time and thereafter, the image generating function 352 is configured to increase the level of similarity of the imitation image 5 to the target images 4a to 4c, by repeatedly generating the imitation image 5 on the basis of a plurality of mutually-different imaging parameter groups and a discrimination result from the discriminating function 353 (explained later). For example, in the generating process for the second time and thereafter, the image generating function 352 changes the randomly-generated imaging parameter groups according to the discrimination result, so as to generate the imitation image 5 by using the post-change imaging parameter groups.

The discriminating function 353 is configured to discriminate between the target images 4a to 4c and the imitation image 5 and to output the discrimination result. The discrimination result is a result of the discrimination by the discriminating function 353 to determine whether or not each of the medical images is any of the target images 4a to 4c.

In the present embodiment, the discriminating function 353 is configured to discriminate between the target images 4a to 4c and the imitation image 5, on the basis of image characteristics of the target images 4a to 4c and the imitation image 5, such as contrast levels, SNRs, resolutions, and/or the like, for example. For example, even when the shape of the examined subject rendered in the target images 4a to 4c is different from the shape of the examined subject rendered in the imitation image 5, if the image characteristics are the same, the discriminating function 353 determines that the imitation image 5 is the same image as the target images 4a to 4c.

Although FIG. 2 illustrates the three target images 4a to 4c, the number of target images being input is not particularly limited. In the following sections, when not being particularly distinguished from one another, the target images 4a to 4c will simply be referred to as target images 4.

When the discriminating function 353 is able to discriminate between the target images 4 and the imitation image 5, the image generating function 352 generates a different imitation image 5 on the basis of the discrimination result from the discriminating function 353.

Generally speaking, every time the process is repeated, because the level of similarity between the imitation image 5 and the target images 4 becomes higher, it becomes more difficult to discriminate between the target images 4 and the imitation image 5. The process of generating the imitation image performed by the image generating function 352 and the process of discriminating between the target images 4 and the imitation image 5 performed by the discriminating function 353 are repeatedly performed until the discriminating function 353 is no longer able to determine whether an input medical image is either a target image 4 or the imitation image 5. When the discriminating function 353 becomes unable to determine which one is an input medical image, between a target image 4 and the imitation image 5, it means that the adversarial learning between the image generating function 352 and the discriminating function 353 has converged.

Next, the image generating function 352 will be explained further in detail. The image generating function 352 is configured to generate the plurality of imitation images 5 on the basis of the plurality of mutually-different imaging parameter groups.

On such occasion, the image generating function 352 is configured to generate the imitation images 5 in accordance with the apparatus characteristics of the magnetic resonance imaging apparatus scheduled to be actually used by the user for the imaging process. In the following sections, the magnetic resonance imaging apparatus scheduled to be used for the imaging process will be referred to as a target magnetic resonance imaging apparatus. The target magnetic resonance imaging apparatus is an example of the second medical imaging apparatus of the present embodiment. The imitation images 5 and medical images captured by the target magnetic resonance imaging apparatus are all magnetic resonance images. In other words, the target magnetic resonance imaging apparatus is a medical imaging apparatus capable of capturing medical images that are of the same type as the imitation image 5.

In the present embodiment, it is assumed that the target magnetic resonance imaging apparatus is an apparatus different from the magnetic resonance imaging apparatus that captured the target images 4. Further, it is assumed that the apparatus characteristics of the target magnetic resonance imaging apparatus are different from the apparatus characteristics of the magnetic resonance imaging apparatus that captured the target images 4.

When the plurality of target images 4 are input to the image generating function 352, the plurality of target images 4 may be images captured by mutually the same magnetic resonance imaging apparatus or may be images captured by mutually-different magnetic resonance imaging apparatuses. In other words, the first medical imaging apparatus that captures the target images 4 does not necessarily have to be a single apparatus. There may be more than one first medical imaging apparatuses.

For example, for the purpose of enabling the target magnetic resonance imaging apparatus to generate an imitation image 5 similar to at least one of the target images 4, the image generating function 352 is configured to adjust the settings of an imaging parameter group generated at random. The settings of the imaging parameter group may be, for example, setting values of the TR, the TE, the TI, or the FA, for example, but are not limited to these examples.

Further, the image generating function 352 is configured to generate an imitation image 5, on the basis of the adjusted imaging parameter group and the apparatus characteristics of the target magnetic resonance imaging apparatus. Further, when the discriminating function 353 has determined that the imitation image 5 is the imitation image 5, the settings of the imaging parameter group are changed so as to generate an imitation image 5 that is different from the previously-generated imitation image 5 on the basis of the post-change imaging parameter group. The image generating function 352 is configured to repeatedly perform the process of changing the settings of the imaging parameter group and generating an imitation image 5, until the adversarial learning between the image generating function 352 and the discriminating function 353 converges.

The settings of the imaging parameter group used for generating the imitation image 5 corresponding to the time when the adversarial learning between the image generating function 352 and the discriminating function 353 has converged, i.e., the imitation image 5 which the discriminating function 353 is unable to determine to be either a target image 4 or an imitation image 5 are appropriate settings to be used by the target magnetic resonance imaging apparatus for capturing a magnetic resonance medical image having image characteristics similar to the image characteristics of at least one of the target images 4.

Further, although FIG. 2 illustrates the example in which the image generating function 352 generates one imitation image 5 at a time, the image generating function 352 may be configured to generate a plurality of imitation images 5 based on mutually-different imaging parameter groups at the same time.

Figure 3:
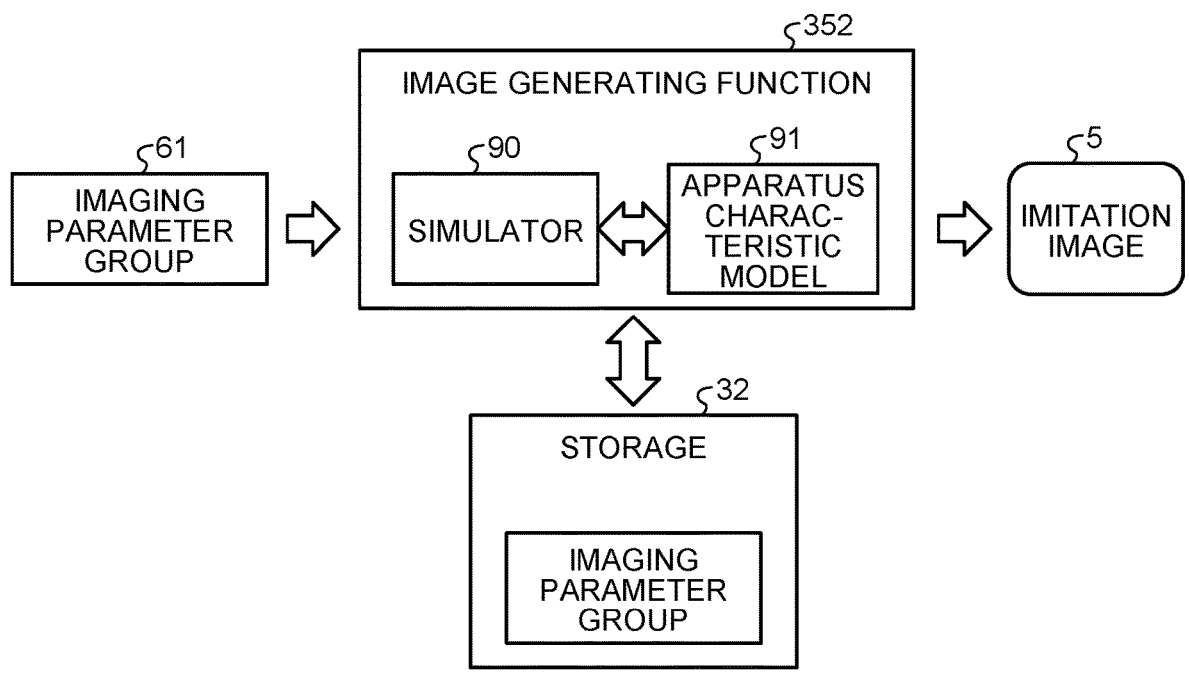
FIG. 3 is a drawing for explaining an exemplary configuration of the image generating function according to the first embodiment.

FIG. 3 is a drawing for explaining an exemplary configuration of the image generating function 352 according to the first embodiment. As illustrated in FIG. 3, the image generating function 352 includes a simulator 90 and an apparatus characteristic model 91.

The simulator 90 is a trained model configured to output a plurality of theoretical values each of which represents a different one of a plurality of medical images captured by a magnetic resonance imaging apparatus, on the basis of an imaging parameter group 61 including a plurality of mutually-different imaging parameters.

For example, the theoretical values representing the medical images may be Magnetic Resonance (MR) signals acquired when the magnetic resonance imaging apparatus captures images of an examined subject, but are not limited to this example. For instance, a magnetic resonance image obtained by reconstructing MR signals may be used as a theoretical value representing the medical image. For example, the simulator 90 may be configured to calculate the theoretical values by using a publicly-known technique of a Bloch Simulator or by using other techniques.

In the present embodiment, from the imaging parameter group 61 including the plurality of imaging parameters generated at random, the simulator 90 is configured to generate the theoretical values while using apparatus characteristics of a virtual magnetic resonance imaging apparatus as a premise. The virtual magnetic resonance imaging apparatus is an example of the virtual medical imaging apparatus of the present embodiment. The apparatus characteristics of the virtual magnetic resonance imaging apparatus are ideal or standard apparatus characteristics. Further, the simulator 90 uses examined subject information indicating the shape and a composition of a virtual examined subject registered in advance, for generating the theoretical values. In this situation, the random generation of the imaging parameter group 61 may be realized by a function of the image generating function 352 or may be realized on the outside of the image generating function 352.

The apparatus characteristic model 91 is a trained model that keeps, in correspondence with one another, the apparatus characteristics of the target magnetic resonance imaging apparatus, settings of the imaging parameter groups 61, and impacts imposed on the theoretical values representing the medical images by the apparatus characteristics and the imaging parameter groups 61.

For example, in some situations, there may be a difference in apparatus characteristics among magnetic resonance imaging apparatuses as follows: The static magnetic field intensity of the magnetic resonance imaging apparatus that captured the target images 4 is 3 T, whereas the static magnetic field intensity of the target magnetic resonance imaging apparatus incorporated in the apparatus characteristic model 91 is 1.5 T. When magnetic resonance imaging apparatuses have mutually-different apparatus characteristics in this manner, magnetic resonance images being captured have mutually-different image characteristics, even when the settings of the imaging parameter group 61 are mutually the same.

Further, for example, when the static magnetic field distribution of the target magnetic resonance imaging apparatus has non-uniformity unique to the apparatus, the apparatus characteristic model 91 has been trained with impacts imposed on the theoretical values by the non-uniformity of the static magnetic field, in correspondence with the settings of the imaging parameter group 61.

For example, upon receipt of an input of a theoretical value generated by the simulator 90 and the settings of the imaging parameter group 61 used for generating the theoretical value, the apparatus characteristic model 91 is configured to output a magnetic resonance image to which the apparatus characteristics of the target magnetic resonance imaging apparatus is appended, as an imitation image 5.

When the discriminating function 353 is able to discriminate between the target images 4 and the imitation image 5, the simulator 90 is configured to change the settings of the imaging parameter group 61 stored in the storage 32. In the present embodiment, on the basis of the discrimination result from the discriminating function 353, the simulator 90 is configured to perform reinforcement learning, so as to change the settings of the imaging parameter group 61 in such a manner that image characteristics more similar to those of the target images 4 are obtained. On the basis of the post-change settings of the imaging parameter group 61, the simulator 90 is configured to generate a theoretical value representing a medical image.

Further, by receiving an input of the newly-generated theoretical value and the post-change settings of the imaging parameter group 61 used for generating the newly-generated theoretical value, the apparatus characteristic model 91 is configured to output a magnetic resonance image to which the apparatus characteristics of the target magnetic resonance imaging apparatus are appended, as a new imitation image 5.

Further, when the adversarial learning between the image generating function 352 and the discriminating function 353 has converged, the image generating function 352 is configured to forward the settings of the imaging parameter group 61 used for generating the imitation image 5 corresponding to the time of the convergence of the adversarial learning, to the output function 354.

Possible functions of the simulator 90 and the apparatus characteristic model 91 are not limited to the examples described above. For instance, when adjusting the settings of the imaging parameter group 61 stored in the storage 32, in accordance with the image characteristics of the target images 4 being input, the simulator 90 may be configured to convert the settings of the imaging parameter group 61 into settings corresponding to the target magnetic resonance imaging apparatus by using the apparatus characteristic model 91.

Further, it is also acceptable to adopt a configuration in which the simulator 90 includes the apparatus characteristic model 91. Further, although FIG. 3 illustrates the single apparatus characteristic model 91, two or more mutually-different apparatus characteristic models 91 corresponding to two or more mutually-different target magnetic resonance imaging apparatuses may be provided. For example, when the process of determining the settings of the imaging parameter group 61 to be configured into one target magnetic resonance imaging apparatus has been completed, the image generating function 352 may be configured to start generating an imitation image 5 based on the apparatus characteristics of another target magnetic resonance imaging apparatus, by using another apparatus characteristic model 91.

Next, the discriminating function 353 will be explained further in detail. As described above, the discriminating function 353 is configured to discriminate so as to determine whether or not each of the plurality of imitation images 5 generated by the image generating function 352 is any of the target images 4. In the present embodiment, for example, the discriminating function 353 is a trained model that has been trained to discriminate between the target images 4 and images other than the target images 4.

From among a medical image group including one or more target images 4 and one or more imitation images 5 being input, the discriminating function 353 is configured to discriminated so as to determine which medical image is a target image 4. The discriminating function 353 is configured to output a result of the discrimination. The discrimination result from the discriminating function 353 is, for example, information indicating which medical image from among the input medical image group is a target image 4.

When the discriminating function 353 is unable to determine whether each one of all the medical images is either an imitation image 5 or a target image 4, even though the input medical image group includes the one or more imitation images 5, it means that the adversarial learning between the image generating function 352 and the discriminating function 353 has converged. For example, when the discriminating function 353 determines that a medical image has a 50% probability of being a target image 4 and a 50% probability of being an imitation image 5, it means that the adversarial learning has converged.

Returning to the description of FIG. 1, the output function 354 is configured to output the imaging parameter group 61 used by the image generating function 352 to generate the imitation image 5 corresponding to the time when the adversarial learning between the image generating function 352 and the discriminating function 353 has converged. In the present embodiment, to "output" may mean any of the following: to transmit information to the outside of the information processing apparatus 30; to save information within the information processing apparatus 30, e.g., in the storage 32; and to cause the display 34 to display information.

For example, to the storage 32, the output function 354 is configured to output, so as to be kept in correspondence with each other, the items and the settings of the imaging parameters included in the imaging parameter group 61 corresponding to the time of the convergence of the adversarial learning. In that situation, the imaging parameter group 61 for the imaging process to be performed by the target magnetic resonance imaging apparatus is saved in the storage 32. Further, the output function 354 may further output information identifying the target magnetic resonance imaging apparatus so as to be kept in correspondence with the items and the settings of the imaging parameters included in the imaging parameter group 61.

In this situation, the imaging parameter group 61 updated during the process of the adversarial learning and the imaging parameter group 61 for the imaging process to be performed by the target magnetic resonance imaging apparatus corresponding to the time of the convergence of the adversarial learning may be saved in mutually-different pieces of storage or may be saved at mutually-different addresses in the storage 32. Alternatively, the output function 354 may make it possible to identify that the imaging parameter group 61 is for the imaging process to be performed by the target magnetic resonance imaging apparatus, by appending information such as a flag indicating that the adversarial learning has converged, to the imaging parameter group 61 updated during the process of the adversarial learning.

Further, the output function 354 may output the imaging parameter group 61 used by the image generating function 352 to generate the imitation image 5 corresponding to the time of the convergence of the adversarial learning, to another information processing apparatus or the target magnetic resonance imaging apparatus, via the NW interface 31.

Further, the output function 354 may cause the display 34 to display the items and the settings of the imaging parameter group 61 used by the image generating function 352 to generate the imitation image 5 corresponding to the time of the convergence of the adversarial learning.

Next, a flow in the imaging parameter determining process performed by the information processing apparatus 30 according to the present embodiment structured as described above will be explained.

Figure 4:
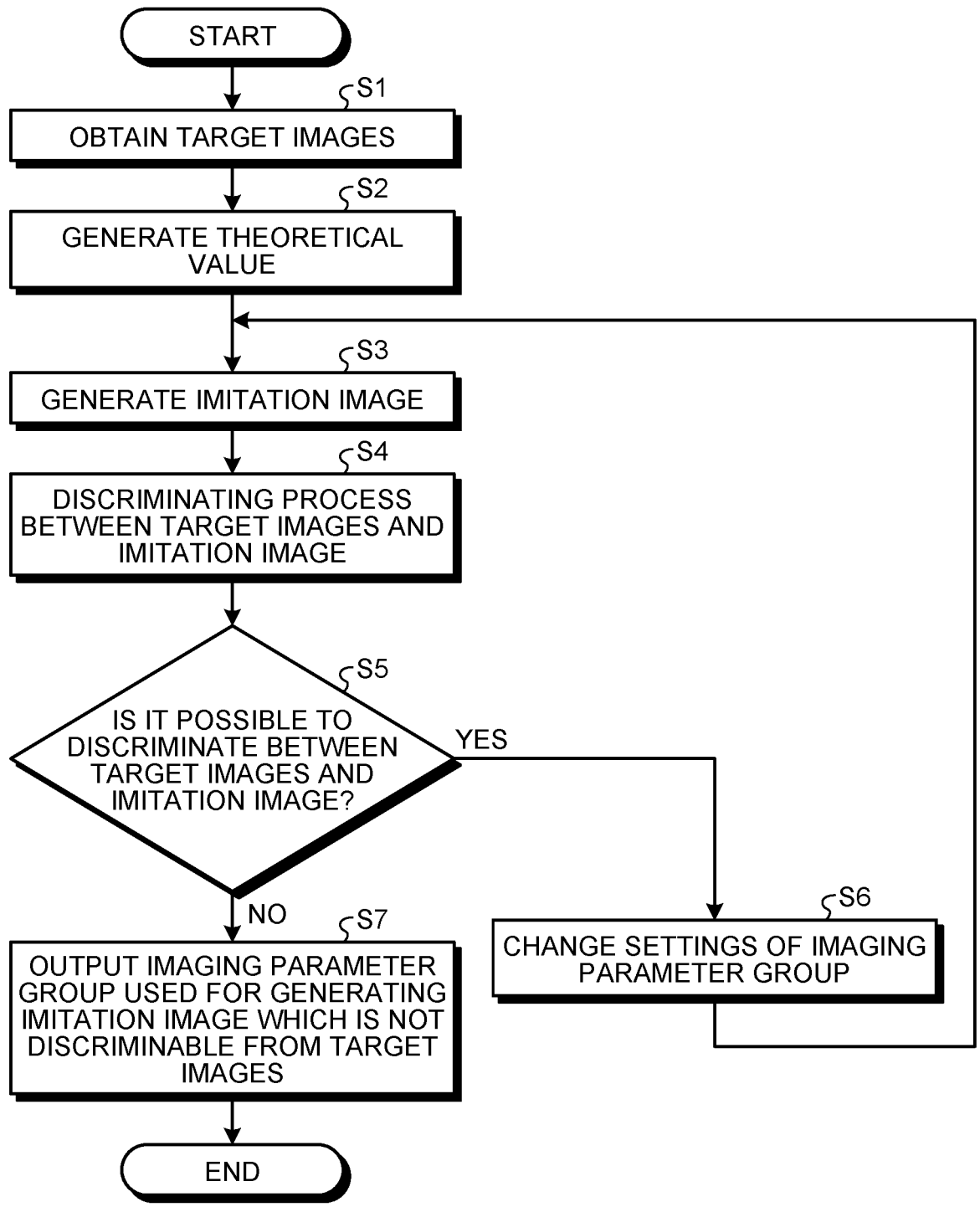
FIG. 4 is a flowchart illustrating an example of a flow in an imaging parameter determining process according to the first embodiment.

FIG. 4 is a flowchart illustrating an example of the flow in the imaging parameter determining process according to the first embodiment. The processes in the flowchart are started, for example, when the user makes an input to start the imaging parameter determining process, by operating the input interface 33.

At first, the obtaining function 351 obtains the target images 4 from an image storage device such as one in the PACS or from a magnetic resonance imaging apparatus (step S1). The obtaining function 351 forwards the obtained target images to the image generating function 352 and the discriminating function 353.

Next, the image generating function 352 generates a theoretical value from the imaging parameter group 61 generated at random (step S2). As described above, the theoretical value may be an MR signal generated simulatively, for example.

Further, on the basis of the generated theoretical value and the apparatus characteristics of the target magnetic resonance imaging apparatus, the image generating function 352 generates an imitation image 5 (Step S3). The image generating function 352 forwards the generated imitation image 5 to the discriminating function 353.

After that, the discriminating function 353 performs the discriminating process between the target images 4 and the imitation image 5 (step S4). Subsequently, the discriminating function 353 forwards a discrimination result to the image generating function 352.

When the discriminating function 353 is able to discriminate between the target images 4 and the imitation image 5 (step S5: Yes), the image generating function 352 changes the settings of the imaging parameter group 61 (step S6).

After that, the image generating function 352 returns to the process at step S3 and generates an imitation image 5 different from the previously-generated imitation image, on the basis of the setting of the imaging parameter group 61 changed at step S6. As long as the discriminating function 353 is able to discriminate between the target images 4 and the imitation image 5, the processes at steps S3 through S6 are repeatedly performed.

On the contrary, when the discriminating function 353 is unable to discriminate between the target images 4 and the imitation image 5 (step S5: No), the adversarial learning between the image generating function 352 and the discriminating function 353 has converged. In that situation, the image generating function 352 forwards, to the output function 354, the settings of the imaging parameter group 61 used for generating the imitation image 5 which the discriminating function 353 was unable to determine as being the imitation image 5.

Further, the output function 354 outputs the imaging parameter group 61 used for generating the imitation image 5 which is not discriminable from the target images 4 (step S7). Thus, the processes in the flowchart end.

As described above, when the information processing apparatus 30 according to the present embodiment is used, through the adversarial learning performed by the image generating function 352 configured to generate the plurality of imitation images 5 on the basis of the plurality of mutually-different imaging parameter groups 61 and the discriminating function 353 configured to discriminate so as to determine whether or not each of the plurality of imitation images 5 is any of the target images 4, it is possible to easily identify the settings of the imaging parameter group 61 that are appropriate for generating the imitation image 5 similar to at least one of the target images 4. Consequently, by using the information processing apparatus 30 according to the present embodiment, it is possible to determine the settings of the imaging parameter group 61 without the technologist or the like having to go through the trial and error process that repeats manually changing the settings of the imaging parameters and capturing magnetic resonance images. It is therefore possible to enhance work efficiency in the magnetic resonance imaging process.

Further, the image generating function 352 included in the information processing apparatus 30 according to the present embodiment is configured to change the settings of the imaging parameter group 61 in accordance with the discrimination result from the discriminating function 353 and to further generate the imitation image 5 different from the generated imitation image 5 on the basis of the post-change settings of the imaging parameter group 61. Consequently, when the information processing apparatus 30 according to the present embodiment is used, the image generating function 352 is able to generate the imitation image 5 that is more similar to at least one of the target images 4 by repeating the generating process. Accordingly, it is possible to identify, with a high level of precision, the settings of the imaging parameter group 61 that enable the target magnetic resonance imaging apparatus to capture a magnetic resonance image similar to at least one of the target images 4.

Further, the image generating function 352 included in the information processing apparatus 30 according to the present embodiment includes: the simulator 90 configured to output the theoretical value by using, as the premise, the virtual magnetic resonance imaging apparatus; and the apparatus characteristic model 91 having incorporated therein the apparatus characteristics of the target magnetic resonance imaging apparatus to be actually used in the imaging process. Consequently, by using the information processing apparatus 30 according to the present embodiment, it is possible to determine the appropriate settings of the imaging parameter group 61, in accordance with the apparatus characteristics of the target magnetic resonance imaging apparatus to be actually used in the imaging process.

In particular, unlike X-ray Computed Tomography (CT) apparatuses by which pixel values are determined as absolute values using CT values, with magnetic resonance imaging apparatuses, pixel values of magnetic resonance images being captured thereby are determined by relative differences in the MR signals acquired during the imaging process. For this reason, it would be difficult in some situations to make settings of imaging parameter groups uniform among mutually-different magnetic resonance imaging apparatuses, which would require the technologist or the like to set an imaging parameter group through the trial and error process for each apparatus. In contrast, when the information processing apparatus 30 according to the present embodiment is used, it is possible to identify the settings of the imaging parameter group even when the magnetic resonance imaging apparatus that captured the target images 4 is different from the target magnetic resonance imaging apparatus to be actually used in the imaging process. It is therefore possible to reduce the work load imposed on the technologist or the like by the trial and error process.

Further, the apparatus characteristics in the present embodiment include at least one selected from among: the gradient coil characteristics, the static magnetic field characteristics, and the radio frequency coil characteristics. Consequently, when the information processing apparatus 30 according to the present embodiment is used, even when the characteristics of the hardware included in the target magnetic resonance imaging apparatus are different from the characteristics of the hardware included in the magnetic resonance imaging apparatus that captured the target images, it is possible to determine the appropriate settings of the imaging parameter group 61.

Further, the imaging parameter group 61 according to the present embodiment includes at least one selected from among: the repetition time, the echo time, the inversion time, and the flip angle of the radio frequency magnetic field pulse of the imaging process performed by the target magnetic resonance imaging apparatus. Consequently, when the information processing apparatus 30 according to the present embodiment is used, when the imaging process is to be performed by a magnetic resonance imaging apparatus, it is possible to easily determine the appropriate settings of the imaging parameters that will impact the image characteristics of the magnetic resonance images.

Further, in the present embodiment, it is determined that the adversarial learning between the image generating function 352 and the discriminating function 353 has converged when the discriminating function 353 included in the information processing apparatus 30 becomes unable to discriminate between at least one of the plurality of imitation images 5 generated by the image generating function 352 and the target images 4. Consequently, when the information processing apparatus 30 according to the present embodiment is used, as a result of the learning process repeated by the image generating function 352 and the discriminating function 353 between each other, the image generating function 352 is able to change the settings of the imaging parameters to appropriate ones, so as to generate an imitation image 5 that is more similar to at least one of the target images 4.

Further, the discriminating function 353 included in the information processing apparatus 30 according to the present embodiment is configured to discriminate between the target images 4 and the imitation image 5, on the basis of the image characteristics of the target images 4 and the imitation image 5. Consequently, when the information processing apparatus 30 according to the present embodiment is used, it is possible to have the adversarial learning performed so as to enable the image generating function 352 to generate the imitation image 5 of which the image characteristics are similar to those of at least one of the target images 4.

Further, the image characteristics of the present embodiment include at least one selected from among: the contrast levels, the SNR values, and the resolutions of the target images 4 and the imitation image 5. Consequently, when the information processing apparatus 30 according to the present embodiment is used, it is possible to reduce the situations where the technologist or the like needs to go through trial and error on the settings of the imaging parameters so as to bring those image characteristics into a desirable state, the image characteristics having a high possibility of being different due to the apparatus characteristics of the individual magnetic resonance imaging apparatuses.

The discriminating function 353 as well as the simulator 90 and the apparatus characteristic model 91 included in the image generating function 352 of the present embodiment are each a trained model generated through deep learning using a neural network or the like, for example.

As for the method of the deep learning, it is acceptable to adopt a multi-layer neural network such as a Convolutional Neural Network (CNN) or a Convolutional Deep Belief Neural Network (CDBN); however possible embodiments are not limited to these examples.

Further, it is also acceptable to realize the discriminating function 353 as well as the simulator 90 and the apparatus characteristic model 91 included in the image generating function 352 by using a method other than the trained models. For example, it is acceptable to use a technique related to a mathematical expression model, a lookup table, or a database to realize the functions of the discriminating function 353 and the image generating function 352.

Further, in the present embodiment, the example was explained in which the trained models are incorporated in the discriminating function 353 and the image generating function 352; however, possible embodiments are not limited to the configuration in this example. For instance, the discriminating function 353 and the image generating function 352 may realize the functions explained in the present embodiment, by reading and executing the trained models from the storage 32. In another example, the trained models may be stored in a storage device provided on the outside of the information processing apparatus 30.

Further, in the present embodiment, the example was explained in which the single information processing apparatus 30 is configured to realize all the functions; however, it is also acceptable to configure two or more information processing apparatuses to share the processes to be performed. In another example, a part or all of the functions of the information processing apparatus 30 may be executed in a cloud environment or the like.

Further, because the settings of the imaging parameter group 61 may vary depending on the body site imaged in the magnetic resonance image being captured and the type of the magnetic resonance image, the process of determining the settings of the imaging parameter group 61 described in the present embodiment is performed for each body site imaged in the magnetic resonance image being captured or each type of magnetic resonance image. For example, it is assumed that a plurality of target images 4 having image characteristics desired by the technologist or the like are used for each body site to be imaged and each type of magnetic resonance image.

Further, in the present embodiment, the example was explained in which the medical imaging apparatus is a magnetic resonance imaging apparatus; however, it is also acceptable to apply the method for determining the settings of the imaging parameter group 61 according to the present embodiment, to other medical imaging apparatuses.

Second Embodiment

In the first embodiment above, the precision level of the imitation image 5 is improved through the adversarial learning. In contrast, in the second embodiment, the precision level of the imitation image 5 is improved by evaluating the levels of similarity between the target images 4 and the imitation image 5.

Figure 5:
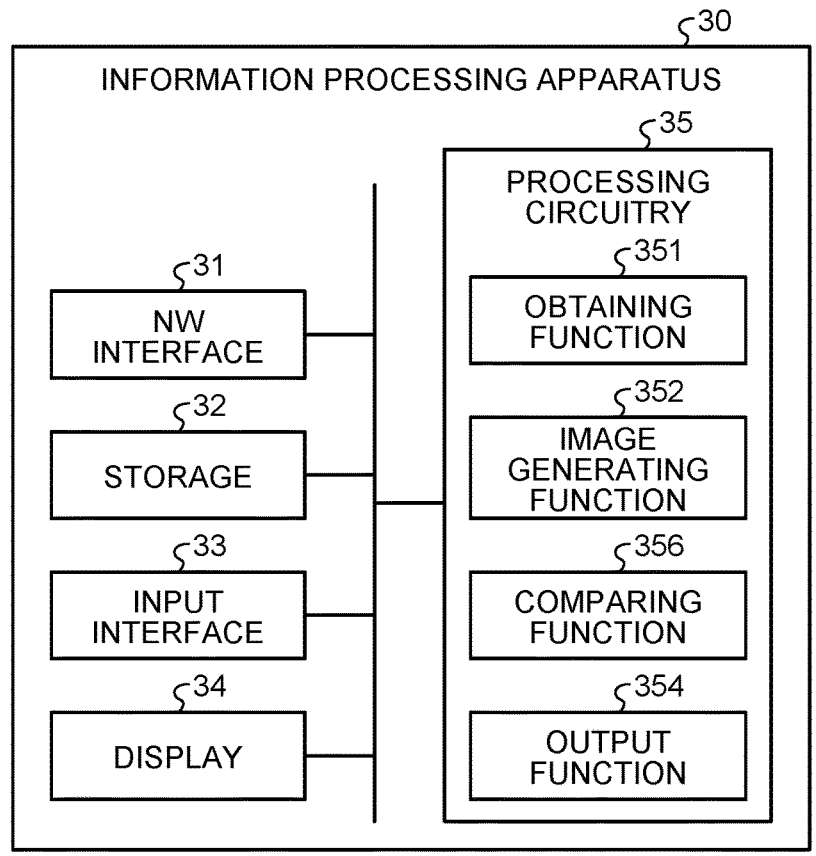
FIG. 5 is a block diagram illustrating an example of an information processing apparatus according to a second embodiment.

FIG. 5 is a block diagram illustrating an example of the information processing apparatus 30 according to a second embodiment. In the present embodiment, the information processing apparatus 30 includes, similarly to the first embodiment, the NW interface 31, the storage 32, the input interface 33, the display 34, and the processing circuitry 35.

Further, the processing circuitry 35 according to the present embodiment includes the obtaining function 351, the image generating function 352, a comparing function 356, and the output function 354. The comparing function 356 is an example of a comparing unit. The obtaining function 351 according to the present embodiment has the same functions as those in the first embodiment.

Figure 6:
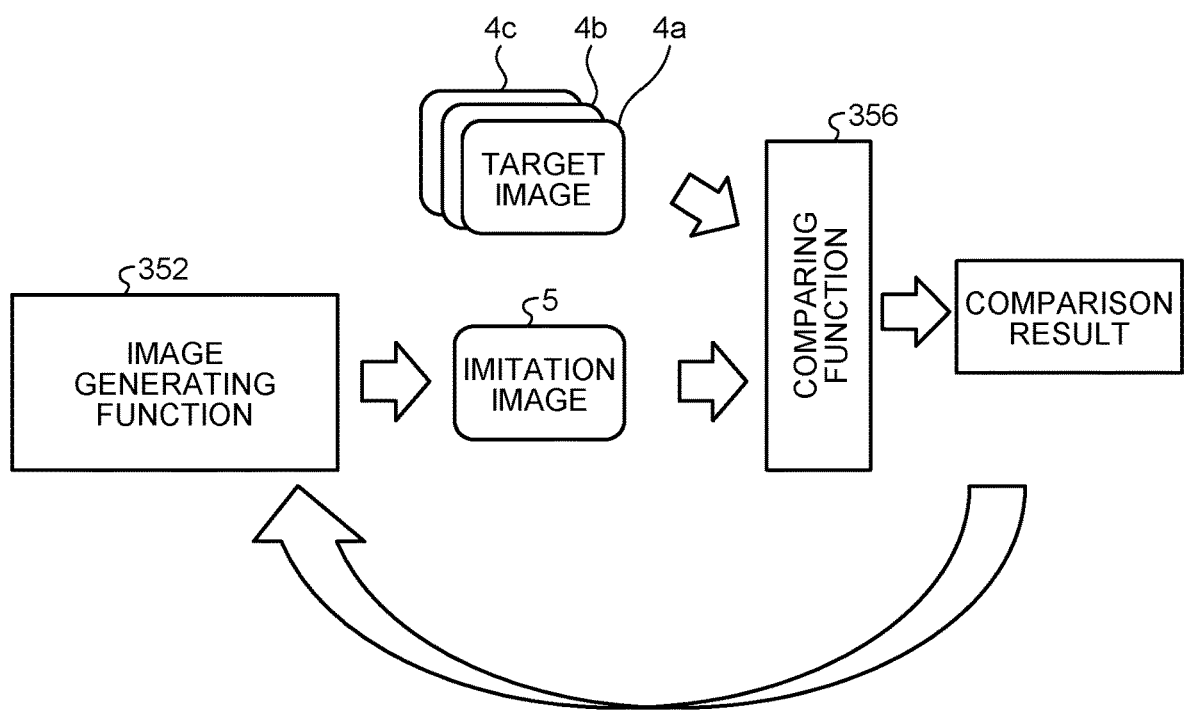
FIG. 6 is a drawing illustrating an example of a relationship between an image generating function and a comparing function according to the second embodiment.

FIG. 6 is a drawing illustrating an example of a relationship between the image generating function 352 and the comparing function 356 according to the second embodiment.

Similarly to the first embodiment, the image generating function 352 according to the present embodiment is configured to generate a plurality of imitation images 5 on the basis of the target images 4 and a plurality of mutually-different imaging parameter groups 61. Further, similarly to the first embodiment, the image generating function 352 according to the present embodiment includes the simulator 90 and the apparatus characteristic model 91.

Further, the image generating function 352 according to the present embodiment is configured to change the settings of the imaging parameter group 61 in accordance with a result of comparison between the target images 4 and the imitation image 5 performed by the comparing function 356 (explained later) and to further generate an imitation image 5 different from the previously-generated imitation image, on the basis of the post-change settings of the imaging parameter group 61.

When the comparing function 356 (explained later) evaluates that the level of similarity in image characteristics between at least one of the target images 4 and the imitation image 5 has been optimized, the image generating function 352 is configured to forward the settings of the imaging parameter group 61 used for generating the imitation image 5, to the output function 354.

Although FIG. 6 illustrates the example in which the image generating function 352 generates one imitation image 5 at a time, the image generating function 352 may be configured to generate, at once, two or more imitation images 5 corresponding to mutually-different settings of the imaging parameter groups 61.

The comparing function 356 is configured to compare each of the plurality of imitation images 5 generated by the image generating function 352 with the target images 4. For example, as illustrated in FIG. 6, the comparing function 356 compares the imitation image 5 generated by the image generating function 352 with the target images 4a to 4c. After that, the comparing function 356 is configured to forward a comparison result to the image generating function 352.

For example, the comparing function 356 is configured to output levels of similarity between the target images 4 and the imitation image 5, as the comparison result.

For example, the comparing function 356 compares the image characteristics between the target images 4 and the imitation image 5 and makes an evaluation in such a manner that the more similar the image characteristics are between a target image 4 and the imitation image 5, the higher is the level of similarity between the target image 4 and the imitation image 5.

For example, the comparing function 356 solves an optimization problem of optimizing the value of an evaluation mathematical function used for evaluating the levels of similarity in image characteristics between the target images 4 and the imitation image 5. The optimization method may be particle swarm optimization, for example, but possible embodiments are not limited to this example. The evaluation mathematical function is optimized when the level of similarity in image characteristics between any of the target images 4 and the imitation image 5 is at a maximum. On such occasion, the comparing function 356 is configured to notify the image generating function 352 that the level of similarity is at the maximum.

Alternatively, the comparing function 356 may output magnitudes of the differences between the target images 4 and the imitation image 5 as the comparison result. In that situation, the comparing function 356 makes an evaluation in such a manner that the larger the difference in image characteristics is between a target image 4 and the imitation image 5, the larger is the difference between the target image 4 and the imitation image 5. In this situation, the comparing function 356 performs an optimization process by using an evaluation mathematical function with which an optimized state is achieved when the magnitude of the difference between any of the target images 4 and the imitation image 5 is minimized.

Further, the output function 354 according to the present embodiment is configured to output, from among the plurality of mutually-different imaging parameter groups 61, an imaging parameter group 61 based on the comparison result from the comparing function 356. More specifically, the output function 354 is configured to output the imaging parameter group 61 used for generating one of the following among the plurality of imitation images 5 generated by the image generating function 352: an imitation image 5 of which the level of similarity to at least one of the target images 4 is maximized; and an imitation image 5 of which the magnitude of difference from at least one of the target images 4 is minimized.

For example, to the storage 32, the output function 354 outputs, so as to be kept in correspondence with each other, the items and the settings of the imaging parameters included in the imaging parameter group 61 corresponding to the time when the evaluation by the comparing function 356 is optimized.

In another example, the output function 354 may output the imaging parameter group 61 used by the image generating function 352 to generate the imitation image 5 corresponding to the time when the evaluation by the comparing function 356 is optimized, to another information processing apparatus or the target magnetic resonance imaging apparatus via the NW interface 31.

Further, the output function 354 may cause the display 34 to display the items and the settings of the imaging parameter group 61 used by the image generating function 352 to generate the imitation image 5 corresponding to the time when the evaluation by the comparing function 356 is optimized.

As explained above, from among the plurality of mutually-different imaging parameter groups 61, the information processing apparatus 30 according to the present embodiment is configured to output the imaging parameter group 61 based on the comparison result between each of the plurality of imitation images 5 generated on the basis of the plurality of mutually-different imaging parameter groups 61 and the target images 4. Consequently, by using the information processing apparatus 30 according to the present embodiment, it is possible to easily determine the settings of the imaging parameter group 61.

Further, the image generating function 352 included in the information processing apparatus 30 according to the present embodiment is configured to change the settings of the imaging parameter group 61 in accordance with the comparison result from the comparing function 356 and to further generate the medical image different from the previously-generated medical image on the basis of the post-change settings of the imaging parameter group 61. Consequently, when the information processing apparatus 30 according to the present embodiment is used, the image generating function 352 is able to generate the imitation image 5 that is more similar to at least one of the target images 4 by repeating the generating process. Accordingly, it is possible to identify, with a high level of precision, the settings of the imaging parameter group 61 that enable the target magnetic resonance imaging apparatus to capture a magnetic resonance image similar to at least one of the target images 4.

Further, in the present embodiment, the comparison result between each of the plurality of imitation images 5 and the target images 4 indicates one of: the levels of similarly between each of the plurality of imitation images 5 and the target images 4; and the magnitudes of the differences between each of the plurality of imitation images 5 and the target images 4. The information processing apparatus 30 according to the present embodiment is configured to output the imaging parameter group 61 used for generating one of the following among the plurality of imitation images 5: the imitation image 5 of which the level of similarity to at least one of the target images 4 is maximized; and the imitation image 5 of which the magnitude of difference from at least one of the target images 4 is minimized. Consequently, by using the information processing apparatus 30 according to the present embodiment, it is possible to easily identify the settings of the imaging parameter group 61 that make it possible to generate the imitation image 5 similar to at least one of the target images 4.

Further, on the basis of the image characteristics of the target images 4 and the imitation image 5, the information processing apparatus 30 according to the present embodiment is configured to calculate one of: the levels of similarity between the target images 4 and the imitation image 5; and the magnitudes of the differences between the target images 4 and the imitation image 5. Consequently, by using the information processing apparatus 30 according to the present embodiment, it is possible to adjust the settings of the imaging parameter group 61, so as to enable the image generating function 352 to generate the imitation image 5 of which the image characteristics are similar to those of at least one of the target images 4.

Although the present embodiment adopts the optimization model using the evaluation mathematical function, it is also acceptable to use a method based on deep learning.

First Modification Example

In the first and the second embodiments described above, the target images 4 having the image characteristics desired by the technologist or the like are discriminated against or compared with the imitation image 5 reflecting the apparatus characteristics of the target magnetic resonance imaging apparatus; however, it is also acceptable to modify the target images 4 in accordance with the apparatus characteristics of the target magnetic resonance imaging apparatus.

Figure 7:
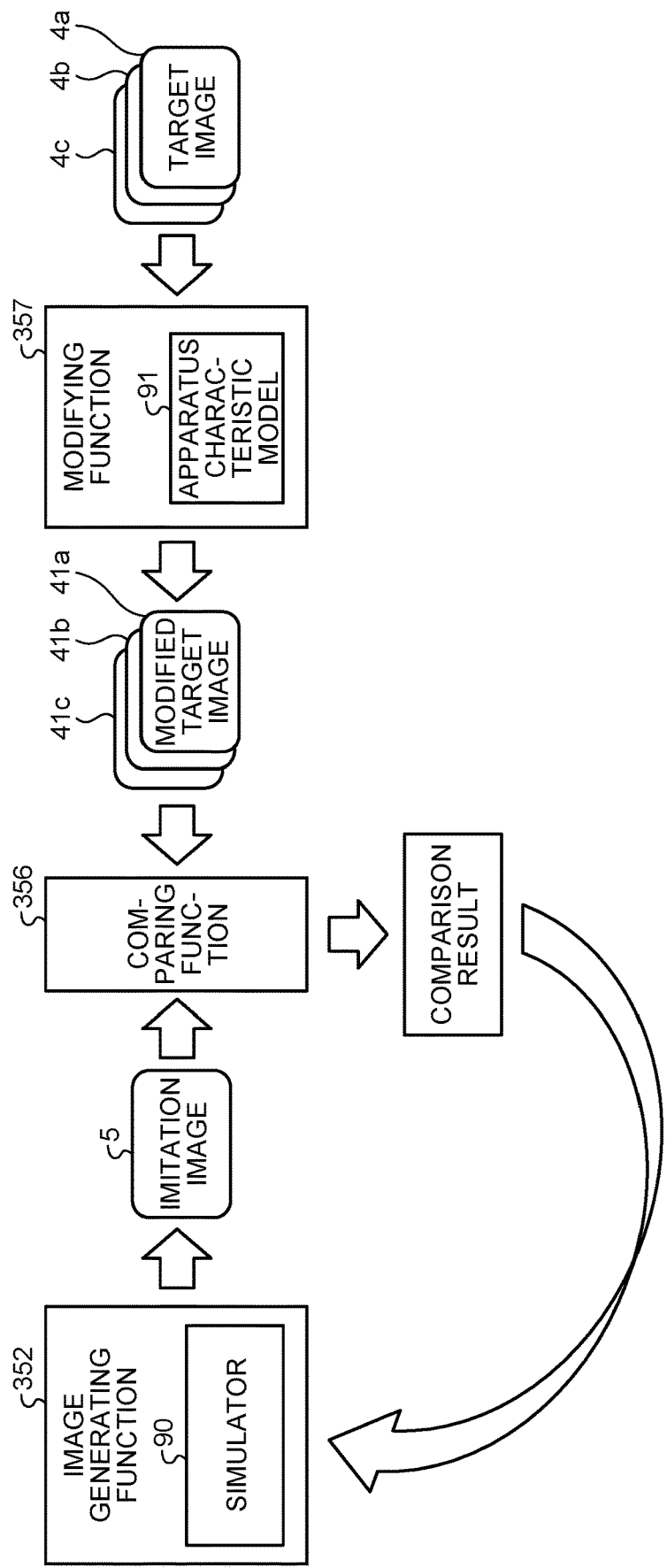
FIG. 7 is a drawing illustrating an example of an outline of a comparing process according to a first modification example.

FIG. 7 is a drawing illustrating an example of an outline of a comparing process according to a first modification example. For instance, the processing circuitry 35 of the information processing apparatus 30 according to the present modification example includes a modifying function 357, in addition to the same functional units as those in the second embodiment. The modifying function 357 is an example of a modifying unit.

As illustrated in FIG. 7, the modifying function 357 includes the apparatus characteristic model 91. For example, the modifying function 357 is configured to apply a modification so as to eliminate, from the target images 4, impacts caused by the difference between the apparatus characteristics of the target magnetic resonance imaging apparatus and the apparatus characteristics of the virtual magnetic resonance imaging apparatus used as the premise by the simulator 90.

Further, the image generating function 352 according to the present modification example does not include the apparatus characteristic model 91. By using the simulator 90, the image generating function 352 is configured to generate a theoretical value representing a medical image, while using as the premise the apparatus characteristics of the virtual magnetic resonance imaging apparatus. In the present modification example, the image generating function 352 is configured to forward the imitation image 5 based on the theoretical value to the comparing function 356.

The comparing function 356 according to the present modification example is configured to compare modified target images 41a to 41c resulting from the modification by the modifying function 357, with the imitation image 5 generated while using, as the premise, the apparatus characteristics of the virtual magnetic resonance imaging apparatus. In the following sections, when not being distinguished from each other, the individual modified target images 41a to 41c will simply be referred to as modified target images 41.

For example, the comparing function 356 according to the present modification example is configured to perform a comparing process by using an optimization mathematical function that maximizes the levels of similarly between the image characteristics of the imitation image 5 generated by using the premise of the apparatus characteristics of the virtual magnetic resonance imaging apparatus and the image characteristics of the modified target images 41 obtained by eliminating the impacts of the apparatus characteristics from the target images 4. Alternatively, the comparing function 356 may use an optimization mathematical function that minimizes the differences between the image characteristics of the imitation image 5 generated by using the premise of the apparatus characteristics of the virtual magnetic resonance imaging apparatus and the image characteristics of the modified target images 41 obtained by eliminating the impacts of the apparatus characteristics from the target images 4.

In the present modification example, the example was explained in which the modifying function 357 is added to the configuration of the information processing apparatus 30 including the comparing function 356 similarly to the second embodiment; however, it is also acceptable to add the modifying function 357 to the configuration of the information processing apparatus 30 including the discriminating function 353 similarly to the first embodiment.

In another example, the modifying function 357 may be configured to modify the target images 4 on the basis of not only the apparatus characteristics of the target magnetic resonance imaging apparatus, but also the apparatus characteristics of the magnetic resonance imaging apparatus that captured the target images 4.

Second Modification Example

In the first and the second embodiments described above, the example was explained in which the processing circuitry 35 of the information processing apparatus 30 includes the single image generating function 352; however, the processing circuitry 35 may include two or more image generating functions 352.

Figure 8:
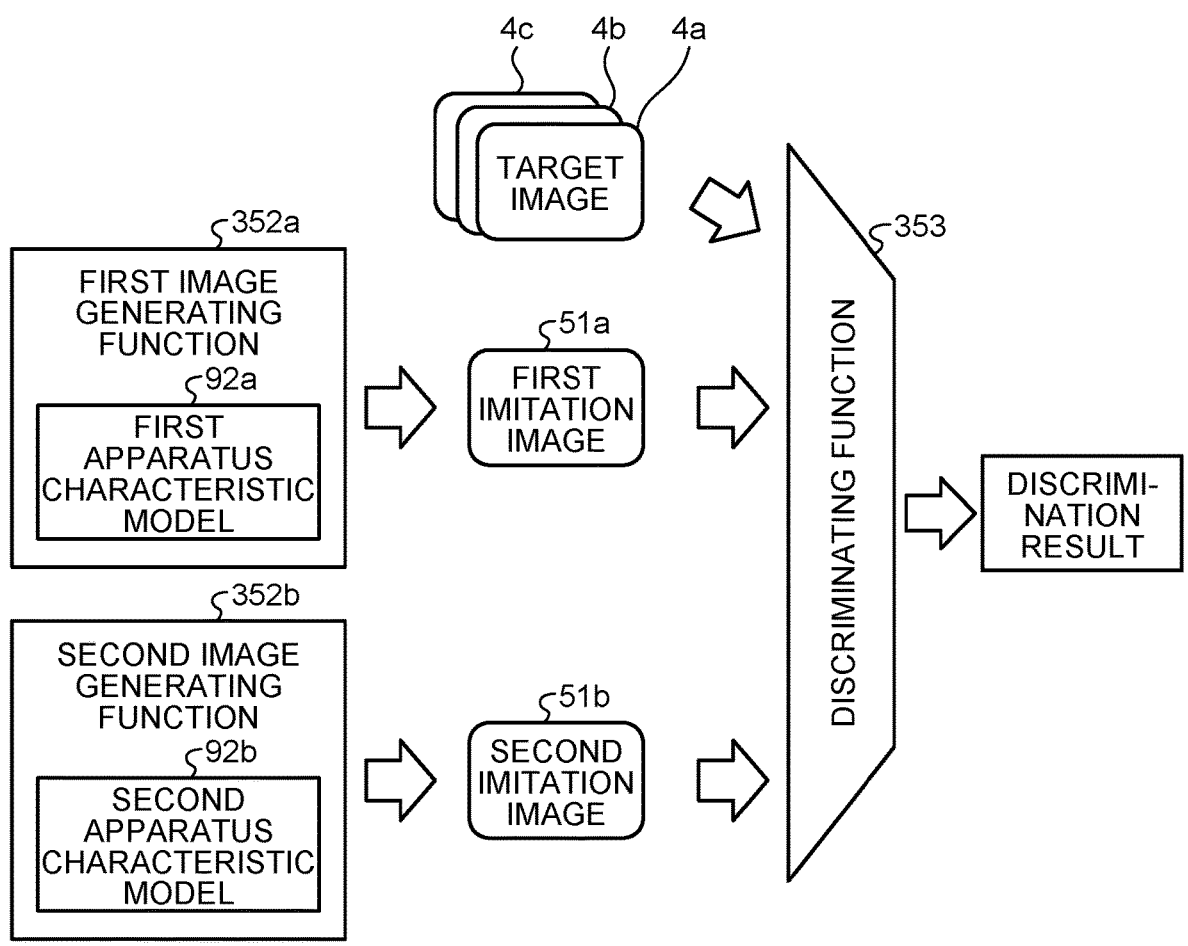
FIG. 8 is a drawing illustrating an example of a relationship between a plurality of image generating functions and a discriminating function according to a second modification example.

FIG. 8 is a drawing illustrating an example of a relationship between a plurality of image generating functions 352a and 352b and the discriminating function 353 according to a second modification example. For instance, the processing circuitry 35 of the information processing apparatus 30 according to the present modification example includes, in addition to the configuration in the first embodiment, the first image generating function 352a and the second image generating function 352b. The first image generating function 352a includes a first apparatus characteristic model 92a. The second image generating function 352b includes a second apparatus characteristic model 92b. Further, although FIG. 8 does not illustrate any simulators 90, the first image generating function 352a and the second image generating function 352b each include the simulator 90.

The first apparatus characteristic model 92a and the second apparatus characteristic model 92b correspond to the apparatus characteristics of mutually-different target magnetic resonance imaging apparatuses. In this situation, the first image generating function 352a is configured to generate a first imitation image 51a that takes into account the apparatus characteristics of a first target magnetic resonance imaging apparatus. In contrast, the second image generating function 352b is configured to generate a second imitation image 51b that takes into account the apparatus characteristics of a second target magnetic resonance imaging apparatus. It is assumed that the first target magnetic resonance imaging apparatus and the second target magnetic resonance imaging apparatus are mutually-different apparatuses.

The discriminating function 353 is configured to perform adversarial learning with the first image generating function 352a and with the second image generating function 352b. With this arrangement, it is possible to simultaneously perform the process of determining the settings of two imaging parameter groups 61 that are appropriate for capturing the target images 4 by using the first target magnetic resonance imaging apparatus and by using the second target magnetic resonance imaging apparatus.

Although FIG. 8 illustrates the example in which the settings of the two imaging parameter groups 61 are determined so as to be used by the two target magnetic resonance imaging apparatuses to capture the desired magnetic resonance images; however, it is also acceptable to adopt a configuration corresponding to three or more target magnetic resonance imaging apparatuses. The processing circuitry 35 of the information processing apparatus 30 may include as many image generating functions 352 as the number of target magnetic resonance imaging apparatuses for which the settings of the imaging parameter groups 61 are to be determined.

Further, in the present modification example, the example was explained in which the plurality of image generating functions 352a and 352b are provided for the configuration of the information processing apparatus 30 including the discriminating function 353 similarly to the first embodiment; however, it is also acceptable to provide the plurality of image generating functions 352a and 352b for the configuration of the information processing apparatus 30 including the comparing function 356 similarly to the second embodiment.

Third Modification Example

In the first and the second embodiments described above, the example was explained in which the information processing apparatus 30 different from the target magnetic resonance imaging apparatus is configured to perform the process of determining the settings of the imaging parameter group 61; however, it is also acceptable to configure the target magnetic resonance imaging apparatus to perform the process.

For example, processing circuitry included in a computer system of a magnetic resonance imaging apparatus may include the obtaining function 351, the image generating function 352, the discriminating function 353, and the output function 354, similarly to the first embodiment. In another example, processing circuitry included in a computer system of a magnetic resonance imaging apparatus may include the obtaining function 351, the image generating function 352, the comparing function 356, and the output function 354, similarly to the second embodiment. In the present modification example, the magnetic resonance imaging apparatus serves as an example of the information processing apparatus.

In this situation, instead of the simulation, the image generating function 352 is configured to generate an imitation image 5, by performing a magnetic resonance imaging process by actually controlling functional units of the magnetic resonance imaging apparatus. For example, the image generating function 352 is configured to generate imitation images 5 by performing an imaging process on an examined subject multiple times, on the basis of a plurality of mutually-different imaging parameter groups 61. In the present modification example, the simulator 90 and the apparatus characteristic model 91 are not used.

In the present modification example, the settings of the imaging parameter group 61 are determined while performing the imaging process by using the target magnetic resonance imaging apparatus to which the imaging parameter group 61 is actually applied. Accordingly, it is possible to identify, with a high level of precision, appropriate settings of the imaging parameter group 61 reflecting the apparatus characteristics of the target magnetic resonance imaging apparatus.

Fourth Modification Example

In the embodiments described above, the image generating function 352 changes the imaging parameters on the basis of one of the discrimination result and the comparison result. On such occasion, it is also acceptable to apply a restriction to the range of the change. Examples of conditions for the restriction include the imaging period, the contrast, the SNR, and the resolution.

According to at least one aspect of the embodiments described above, it is possible to easily identify the imaging parameters that are appropriate for capturing the medical images having the target image characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
processing circuitry configured to:
  obtain a target image captured by a first medical imaging apparatus;
  generate a plurality of imitation medical images based on a plurality of imaging parameter groups and apparatus characteristics of a second medical imaging apparatus different from the first medical imaging apparatus, the imitation medical images being images imitating the target image;
  obtain a magnitude of a difference or a level of similarity between each of the imitation medical images and the target image by comparing each of the plurality of imitation medical images with the target image; and
  output one of the plurality of imaging parameter groups based on a result of the comparison between the plurality of imitation medical images and the target image, the one of the plurality of imaging parameter groups being output as an imaging parameter group to be used for imaging performed by the second medical imaging apparatus,
wherein the processing circuitry is further configured to perform the generation of the imitation medical images by:
  changing settings of the imaging parameter group to increase the level of similarity or to reduce the magnitude of the difference;
  generating a new imitation medical image different from the plurality imitation medical images previously generated, the new imitation medical image being generated based on the changed settings of the imaging parameter group and the apparatus characteristics of the second medical imaging apparatus;
  obtaining a magnitude of a difference or a level of similarity between the new imitation medical image and the target image by comparing the new imitation medical image and the target image; and
  changing settings of the imaging parameter group to increase a level of similarity between the new imitation medical image and the target image or to reduce the magnitude of a difference between the new imitation medical image and the target image,
wherein the one of the plurality of imaging parameter groups to be output by the processing circuitry is an imaging parameter group used for generating a first imitation medical image whose level of similarity to the target image is maximized or an imaging parameter group used for generating a second imitation medical image whose magnitude of a difference from the target image is minimized, out of the imaging parameter groups used for generating different imitation medical images.

2. The information processing apparatus according to claim 1, further comprising a memory having stored therein:
a simulator configured to output a plurality of theoretical values representing the plurality of imitation medical images, respectively, based on the plurality of imaging parameter groups; and
at least one apparatus characteristic model keeping, in correspondence with one another, a characteristic of a second medical imaging apparatus capable of capturing a medical image of a same type as the plurality of imitation medical images, settings of the imaging parameter groups, and impacts imposed on the theoretical values by the characteristic and the settings of the imaging parameter groups, wherein
the processing circuitry is further configured to read and execute the simulator and the apparatus characteristic model from the memory, and
the simulator functions as a virtual medical imaging apparatus configured to capture the plurality of imitation medical images.

3. The information processing apparatus according to claim 2, wherein
the second medical imaging apparatus is a magnetic resonance imaging apparatus, and
the characteristic of the magnetic resonance imaging apparatus includes at least one of a gradient coil characteristic, a static magnetic field characteristic, or a radio frequency coil characteristic.

4. The information processing apparatus according to claim 2, wherein
the second medical imaging apparatus is a magnetic resonance imaging apparatus, and
the imaging parameter groups include at least one of repetition time, echo time, inversion time, or a flip angle of a radio frequency magnetic field pulse used in an imaging process performed by the magnetic resonance imaging apparatus.

5. The information processing apparatus according to claim 1, wherein the processing circuitry is further configured to calculate one of a level of similarity between each of the plurality of imitation medical images and the target image, and a magnitude of a difference between each of the plurality of imitation medical images and the target image, based on an image characteristic of each of the plurality of imitation medical images and an image characteristic of the target image.

6. The information processing apparatus according to claim 1, wherein the image characteristic includes at least one of contrast levels, SNR values, or resolutions of the target image and the plurality of imitation medical images.

* * * * *